United States Patent
Reints et al.

(10) Patent No.: US 10,257,987 B2
(45) Date of Patent: Apr. 16, 2019

(54) FEEDING SYSTEM FOR AN AGRICULTURAL IMPLEMENT

(71) Applicant: CNH Industrial America LLC, New Holland, PA (US)

(72) Inventors: Daniel John Reints, Bettendorf, IA (US); Timothy Alan Meeks, Donahue, IA (US); Aryon Wayne Shondel, DeWitt, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/328,374

(22) PCT Filed: Jul. 22, 2015

(86) PCT No.: PCT/US2015/041553
§ 371 (c)(1),
(2) Date: Jan. 23, 2017

(87) PCT Pub. No.: WO2016/014675
PCT Pub. Date: Jan. 28, 2016

(65) Prior Publication Data
US 2017/0208745 A1    Jul. 27, 2017

(51) Int. Cl.
| | |
|---|---|
| *A01F 15/10* | (2006.01) |
| *A01D 46/08* | (2006.01) |
| *A01D 46/10* | (2006.01) |
| *A01F 12/46* | (2006.01) |
| *A01F 12/48* | (2006.01) |
| *A01F 15/08* | (2006.01) |

(52) U.S. Cl.
CPC .............. *A01F 15/10* (2013.01); *A01D 46/08* (2013.01); *A01D 46/10* (2013.01); *A01F 12/46* (2013.01); *A01F 12/48* (2013.01); *A01F 15/0825* (2013.01)

(58) Field of Classification Search
CPC ...... B65G 65/42; B65G 47/19; B65G 65/425; B65G 65/466; B65G 67/606; B65G 15/30; B65G 33/14; B65G 47/18; B63B 27/22; A01D 90/10; A01D 41/1217; A01F 15/00
USPC ............................................... 414/142.3, 526
See application file for complete search history.

(56) References Cited

U.S. PATENT DOCUMENTS

| | | | | |
|---|---|---|---|---|
| 777,084 | A | * | 12/1904 | Dwyer ..................... B60P 1/56 298/7 |
| 889,906 | A | * | 6/1908 | Claypoole ................ B60P 1/56 193/4 |
| 2,505,982 | A | * | 5/1950 | Meissner ................ B63B 27/22 126/214 A |
| 3,212,652 | A | * | 10/1965 | Roberts ................ B65G 65/466 198/578 |

(Continued)

*Primary Examiner* — Arpad Fabian-Kovacs
(74) *Attorney, Agent, or Firm* — Patrick M. Sheldrake; Peter K. Zacharias

(57) ABSTRACT

A feeding system for an agricultural implement includes a hopper configured to receive agricultural crop material. An auger extending across the hopper is configured to meter the agricultural crop material from the hopper into a tapered passageway. A movable belt is disposed along one side of the tapered passageway and is configured to urge the agricultural crop material through the tapered passageway toward an outlet of the tapered passageway to form the agricultural crop material into a mat having a thickness substantially equal to a width of the outlet.

13 Claims, 5 Drawing Sheets

(56) References Cited

U.S. PATENT DOCUMENTS

| | | | | |
|---|---|---|---|---|
| 3,489,296 A | * | 1/1970 | Snow | B63B 27/22 222/270 |
| 3,976,214 A | * | 8/1976 | Etwell | A01C 11/00 111/907 |
| 4,004,700 A | * | 1/1977 | Empey | B63B 27/22 105/240 |
| 4,117,920 A | | 10/1978 | Oury | |
| 4,242,026 A | * | 12/1980 | Vaughan | B63B 27/22 414/133 |
| 4,350,467 A | * | 9/1982 | Soros | B63B 27/22 414/133 |
| 4,452,134 A | | 6/1984 | Muse | |
| 4,512,705 A | * | 4/1985 | Gutsch | B65G 65/42 198/550.12 |
| 4,740,130 A | * | 4/1988 | Prins | B61D 7/30 105/241.2 |
| 4,800,902 A | * | 1/1989 | Maust | A01D 41/1208 460/114 |
| 4,803,832 A | | 2/1989 | Crawford | |
| 4,970,849 A | | 11/1990 | Friesen | |
| 5,348,435 A | * | 9/1994 | Bissex | B65G 65/466 414/306 |
| 5,362,040 A | | 11/1994 | Midavaine et al. | |
| 5,396,753 A | | 3/1995 | Cullen | |
| 5,518,353 A | * | 5/1996 | Pettersen | B63B 27/22 198/516 |
| 5,655,872 A | * | 8/1997 | Plotkin | B60P 1/40 198/313 |
| 6,032,446 A | | 3/2000 | Gola et al. | |
| 6,901,732 B2 | | 6/2005 | Bares et al. | |
| 7,003,933 B2 | | 2/2006 | Fukumori et al. | |
| 7,267,051 B2 | | 9/2007 | Richman et al. | |
| 7,509,785 B2 | * | 3/2009 | Fukumori | A01F 15/07 53/118 |
| 7,818,954 B2 | * | 10/2010 | Rempe | A01F 15/106 56/341 |
| 8,627,767 B2 | | 1/2014 | Roberge et al. | |
| 9,253,948 B2 | * | 2/2016 | Olander | A01F 15/0705 |
| 9,345,196 B1 | * | 5/2016 | Weber | A01F 15/085 |
| 9,681,605 B2 | * | 6/2017 | Noonan | A01D 46/082 |
| 2003/0188956 A1 | | 10/2003 | Lepage | |
| 2009/0095662 A1 | * | 4/2009 | Redekop | A01D 90/02 209/509 |
| 2009/0104952 A1 | * | 4/2009 | Redekop | A01D 45/028 460/80 |
| 2010/0193411 A1 | * | 8/2010 | Redekop | A01D 90/02 209/509 |
| 2010/0287899 A1 | * | 11/2010 | Mackin | A01D 41/127 56/10.2 R |
| 2012/0099948 A1 | * | 4/2012 | Bump | G01G 13/16 414/21 |
| 2012/0282985 A1 | * | 11/2012 | Coers | A01D 41/1217 460/114 |
| 2014/0041730 A1 | * | 2/2014 | Naizer | G01F 23/284 137/2 |
| 2014/0165856 A1 | | 6/2014 | Varley | |
| 2015/0360856 A1 | * | 12/2015 | Oren | B65G 65/42 414/411 |

* cited by examiner

FEEDING SYSTEM FOR AN AGRICULTURAL IMPLEMENT

CROSS REFERENCE TO RELATED APPLICATION

This application claims priority from and the benefit of U.S. Provisional Application Ser. No. 62/028,205, entitled "FEEDING SYSTEM FOR AN AGRICULTURAL IMPLEMENT," filed Jul. 23, 2014, which is hereby incorporated by reference in its entirety.

BACKGROUND

The invention relates generally to the field of compressible materials, and more specifically, to feeding systems for an agricultural implement.

Generally, agricultural harvesters include multiple harvesting heads distributed across a width of the harvester. Each harvesting head is configured to harvest crops along a row as the harvester travels across a field. The harvested crops may be directed, via an air flow, to a bin and/or to a baling chamber where the harvested crops are wrapped or tied to form bales. Unfortunately, inconsistencies may exist in a flow rate of the harvested crops and/or in a density of the harvested crops flowing from the harvesting heads to the baling chamber, which in turn may lead to inconsistencies in a density and/or shape of the bales formed in the baling chamber.

BRIEF DESCRIPTION

In one embodiment, a feeding system for an agricultural implement includes a hopper configured to receive agricultural crop material. An auger extending across the hopper is configured to meter the agricultural crop material from the hopper into a tapered passageway. A movable belt is disposed along one side of the tapered passageway and is configured to urge the agricultural crop material through the tapered passageway toward an outlet of the tapered passageway to form the agricultural crop material into a mat having a thickness substantially equal to a width of the outlet.

In one embodiment, an agricultural implement includes a feeding system having a hopper configured to receive agricultural crop material and to facilitate transfer of the agricultural crop material into a passageway extending vertically below the hopper. The feeding system also includes a pair of driven belts disposed on opposite sides of the passageway. Each belt of the pair of driven belts is configured to urge the agricultural crop material through the passageway toward an outlet of the passageway via movement of each belt of the pair of driven belts to form the agricultural crop material into a mat having a thickness substantially equal to a width of the outlet.

In one embodiment, a feeding system of an agricultural implement includes a sensor assembly configured to be disposed proximate to an outlet of a passageway. The sensor assembly is configured to output signals indicative of a thickness, a weight, a density, or any combination thereof, of a mat of agricultural crop material passing through the outlet. The control system also includes a processor configured to receive the signals from the sensor assembly and to provide control signals to one or more control systems to adjust a position, an orientation, a linear speed, or any combination thereof, of a belt disposed along one side of the passageway.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
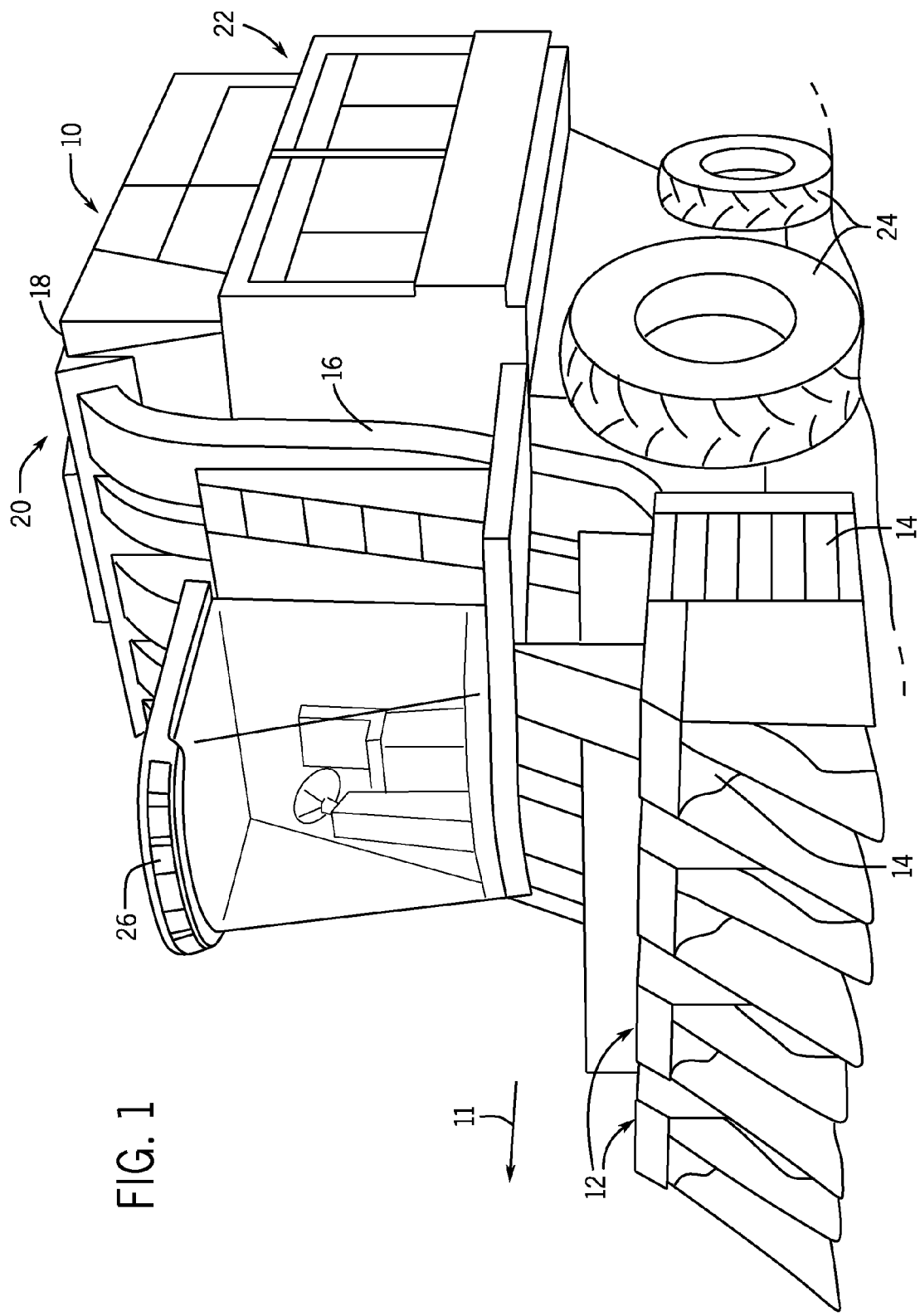
FIG. 1 is a perspective view of an embodiment of a harvester configured to harvest rows of a crops.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Agricultural harvesters include multiple harvesting heads (e.g., harvesting units, drums, or the like) distributed across a width of the harvester to harvest crops along a row as the harvester travels across a field. Once harvested, the crops are carried via an air flow from the harvesting heads toward a baling chamber. The embodiments disclosed herein include a feeding system disposed generally between the harvesting heads and the baling chamber. The feeding system is configured to receive the crops via the air flow and to form the crops into a relatively consistent mat (e.g., slab, brick, or package). In some cases, the feeding system may additionally pack the crops and/or adjust a density of the crops. In particular, the feeding system disclosed herein includes a hopper configured to receive the crops from the harvesting heads via the air flow. An auger coupled to the hopper is configured to direct the crops into a converging passageway that extends vertically below the hopper and is defined by opposed belts (e.g., movable belts). Movement of the belts directs the crops through the converging passageway, thereby feeding the crops into a mat. The crops are directed through a relatively narrow outlet onto a generally horizontal conveyor. The conveyor is configured to carry the mat to the baling chamber (or to a prechamber of a baling chamber). A control system is configured to adjust a position, an orientation, and/or a speed of various elements of the feeding system, such as the belts, the conveyor, or the auger, based on characteristics of the mat and/or the crops, for example. Providing the consistent mat to the baling chamber enables the baling chamber to effectively and efficiently form a high-quality, dense, and consistent bale. In some cases, the disclosed embodiments may be utilized to effectively and efficiently form smaller and/or more dense bales than conventional harvesters and balers. Furthermore, the disclosed embodiments may enable higher harvesting capacity and/or increased output of the harvested crops.

Turning now to the drawings, FIG. 1 is a perspective view of an embodiment of a harvester 10 configured to harvest rows of a crops. The harvester 10 includes harvesting heads 12 (e.g., harvesting heads) having one or more rotors 14 to harvest the crops as the harvester 10 travels across a field in a direction of travel 11. The harvester 10 also includes an air system to facilitate flow of the crops through the harvester 10. For example, in the illustrated embodiment, a pneumatic channel 16 (e.g., conduit) extends between the harvesting heads 12 and an inlet of a hopper 18 of a feeding system 20, and is configured to transfer the crops from the harvesting heads 12 to the hopper 18. In some embodiments, at least a portion of the hopper 18 may be perforated to enable air from the pneumatic channel 16 to flow out of the hopper 18. As discussed in more detail below, the feeding system 20 feeds the crops into a consistent mat and transfers the mat to a baling chamber of a baler 22. In certain embodiments, the baler 22 may be a rectangular baler, although the feeding system 20 may also be adapted for use with round balers. Further, while the baler 22 is shown as part of the harvester 10, the baler 22 may be part of a separate implement, or another vehicle, in certain embodiments.

In the illustrated embodiment, the harvester 10 is self-propelled and moves the harvesting heads 12 through a field using wheels 24. In some embodiments, the harvesting heads 12 are part of an implement configured to be driven through the field by a prime mover (e.g., tractor). A cab 26 may include an interface with controls for operating the harvester 10 and for monitoring the harvesting process. Although four harvesting heads 12 are shown in FIG. 1, it should be understood that the harvester 10 may have any suitable number of harvesting heads 12, such as 1, 2, 3, 4, 5, 6, 7, 8, 9, 10, or more harvesting heads 12.

Figure 2:
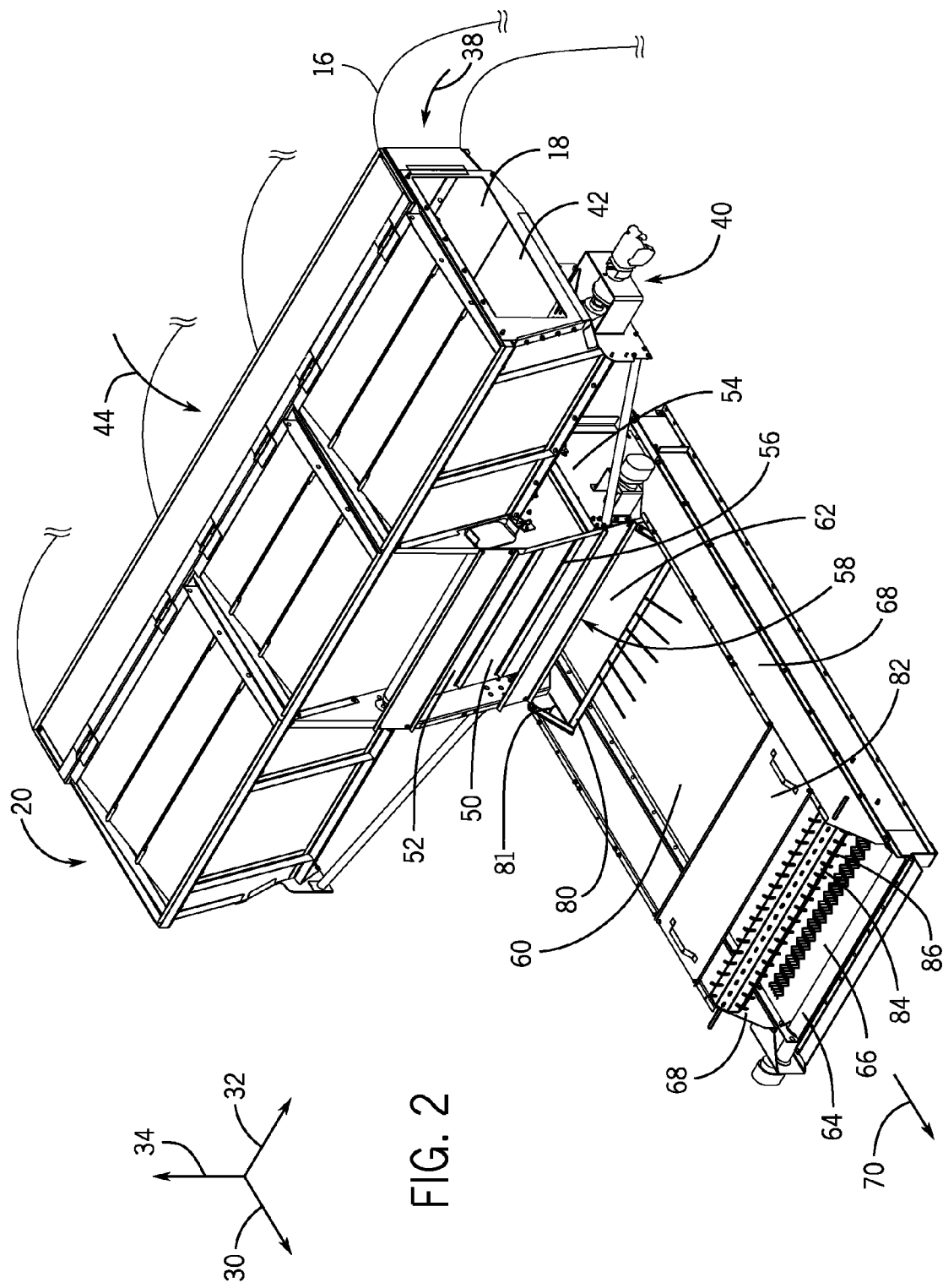
FIG. 2 is a perspective view of an embodiment of a feeding system for the harvester of FIG. 1.

FIG. 2 is a perspective view of an embodiment of a feeding system 20 that may be used in the harvester 10 of FIG. 1. The feeding system 20 may be described with reference to an axial axis or direction 30, a lateral axis or direction 32, and a vertical axis or direction 34. An air flow 38 in the pneumatic channel 16 directs the crops into the hopper 18. In the illustrated embodiments, three pneumatic channels 16 deliver the crops from the harvesting heads 12 into the hopper 18. In some embodiments, each of the pneumatic channels 16 is configured to deliver the crops from one or more corresponding harvesting heads 12 to the hopper 18. Any suitable number of pneumatic channels 16 may be provided (e.g., 1, 2, 3, 4, 5, 6, 7, 8, 9, 10, or more), and each of the pneumatic channels 16 may be configured to deliver the crops from any suitable number of corresponding harvesting heads 12 (e.g., 1, 2, 3, 4, 5, 6, 7, 8, 9, 10, or more).

As shown, the hopper 18 is one single, continuous trough configured to extend across the harvester 10 in the lateral direction 32. An auger 40 is disposed at an outlet 42 of the hopper 18 and extends across the hopper 18 in the lateral direction 32. As discussed in more detail below, flighting on one side of the auger 40 may be oriented in one direction, while flighting on the other side of the auger may be oriented in another, different direction. Such a configuration enables the auger 40 to direct the crops toward a center portion 44 of the hopper 18 and into a passageway between belts 50 (e.g., movable belts or chains).

In the illustrated embodiments, the belts 50 are positioned on axially opposite sides of the passageway and converge toward one another downwardly along the vertical axis 34 between the auger 40 and an outlet 58 of the passageway. Each of the belts 50 has a continuous surface 52 extending laterally between supports 54. As discussed in more detail below, protrusions 56 extend across the continuous surface 52 of each of the belts 50 to engage the crops, thereby urging the crops through the passageway. The crops are directed through the passageway to the relatively narrow outlet 58. As the crops are directed through the passageway and/or as the crops emerge from the outlet 58, the crops are formed into a dense, consistent mat.

The mat exits the passageway onto a conveyor 60 (e.g., a generally horizontal conveyor). The conveyor 60 extends axially between the outlet 58 and a baling chamber (e.g., the baling chamber or a baling prechamber). Thus, a first end 62 of the conveyor 60 is positioned adjacent to the outlet 58 for receiving the mat, and a second end 64 of the conveyor 60 may be positioned adjacent to the baling chamber. The conveyor 60 has a continuous surface 66 that extends laterally between opposed walls 68. In some embodiments, the conveyor 60 and/or the opposed walls 68 may converge (e.g., taper) along the axial axis 30 between the first end 62 and the second end 64 of the conveyor 60. As shown, the conveyor 60 is configured to carry the mat rearwardly as shown by arrow 70 (e.g., opposite the direction of travel 11) from the outlet 58 toward the baling chamber.

As shown, the feeding system 20 includes a harrow 80 (e.g., a comb or a windguard) to groom and/or level the mat. In some embodiments, the harrow 80 may support (e.g., hold down) the mat and block the crops within the mat from being blown away by wind, for example. The harrow 80 may be positioned in any suitable location. For example, the harrow 80 may be rotatably coupled to the walls 68 and/or to the support 54, and tines of the harrow 80 may extend generally vertically downward and/or axially to contact the mat. In some embodiments, the harrow 80 may be configured to float on the mat, thereby combing the mat as the mat moves toward the baler 22. In some embodiments, a harrow angle 81 formed between the harrow 80 and the axial axis 30 may be controlled by a mechanical stop and/or electronic control system, as discussed in more detail below.

In the illustrated embodiment, a cover 82 extends laterally between the walls 68 vertically above the conveyor 60 to contain the mat and/or to protect the mat from debris, for example. Although one cover 82 is shown, it should be understood that multiple covers 82 may extend along the conveyor 60 and/or that the cover 82 may have any suitable size or shape. In the illustrated embodiment, a spiked wheel 84 having protrusions 86 extends laterally between the walls 68 vertically above the conveyor 60. The spiked wheel 84 is rotatably coupled to the walls 68, and rotation of the spiked wheel 84 may urge the mat rearwardly 70 toward the baling chamber. Although one spiked wheel 84 is shown, it should be understood that multiple spiked wheels 84 may be disposed along the conveyor 60, and the spiked wheels 84 may have any suitable configuration for urging the mat toward the baling chamber.

Figure 3:
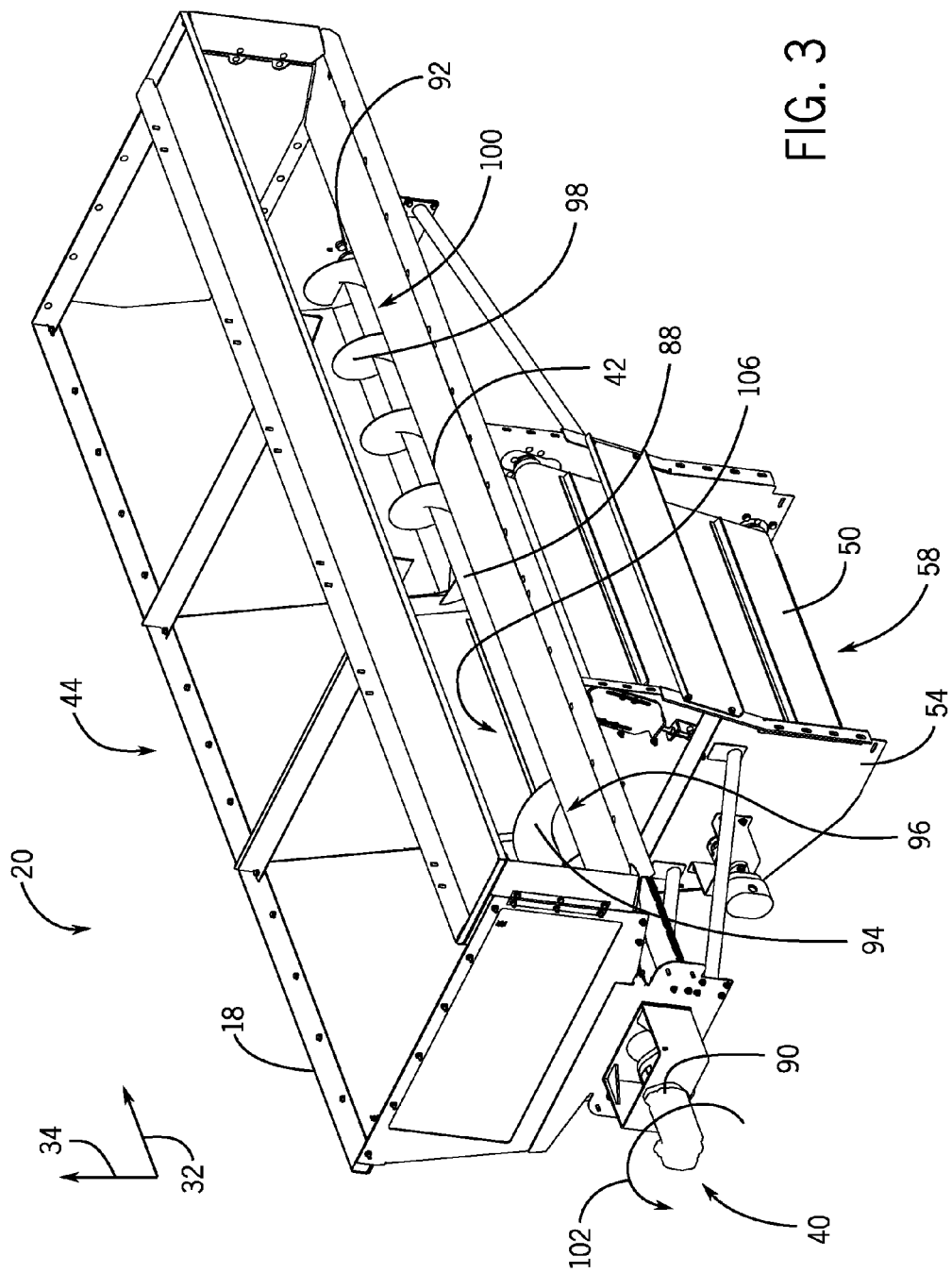
FIG. 3 is a perspective view of a portion of the feeding system of FIG. 2.

FIG. 3 is a perspective view of a portion of the feeding system 20 of FIG. 2. As illustrated, the auger 40 is positioned adjacent to the outlet 42 of the hopper 18. The auger 40 includes a shaft 88 extending laterally from a first end 90 to a second end 92. A first helicoid structure 94 (e.g., flighting) in a first portion 96 of the auger 40 is oriented in a first orientation relative to the shaft 88, while a second helicoid structure 98 in a second portion 100 of the auger 40 is oriented in a second orientation relative to the shaft 88, different from the first orientation. In certain embodiments, the first helicoid structure 94 extends in a first rotational direction, and the second helicoid structure 98 extends in a second rotational direction, opposite the first rotational direction. Thus, as the auger 40 rotates as shown by arrow 102, both the first portion 96 and the second portion 100 of the auger 40 direct the crops toward the center portion 44 of the hopper outlet 42. Such a configuration facilitates transfer of the crops into a passageway 106 defined by the supports 54 and the belts 50, which is located vertically below the center portion 44 of the hopper outlet 42. In other embodiments, the auger 40 may have only one (e.g., a single) helicoid structure.

In the illustrated embodiment, the passageway 106 extends vertically below the center portion 44 of the hopper outlet 42. However, in other embodiments, the passageway 106 may extend from any suitable portion of the hopper 18. For example, the passageway 106 may be disposed proximate to one lateral end of the hopper 18. In such cases, the conveyor 60 may extend from the passageway 106 along one lateral side of the agricultural harvester 10. Such a configuration may be advantageous in agricultural harvesters 10 having an off-center baler 22 that is disposed on one lateral side of the agricultural harvester 10. Furthermore, in some embodiments, the feeding system 20 may include more than one passageway 106 (e.g., 2, 3, 4, 5, or more passageways 106) configured to direct the crops to the conveyor 60. For example, two passageways 106 may feed two mats onto one relatively wide conveyor 60. In some such embodiments, the conveyor 60 may taper between the respective outlets 58 of the passageways 106 and the baling chamber 24, thereby compressing the two mats into one mat of a desired shape and size for the baling chamber 24. Additionally, in some such embodiments, the hopper 18 may have multiple compartments, or multiple separate hoppers 18 may be provided. For example, in some embodiments, each of the pneumatic channels 16 may deliver the crops into one corresponding, separate compartment of the hopper 18, and the crops in each compartment of the hopper 18 may be transferred to separate respective passageways 106.

Figure 4:
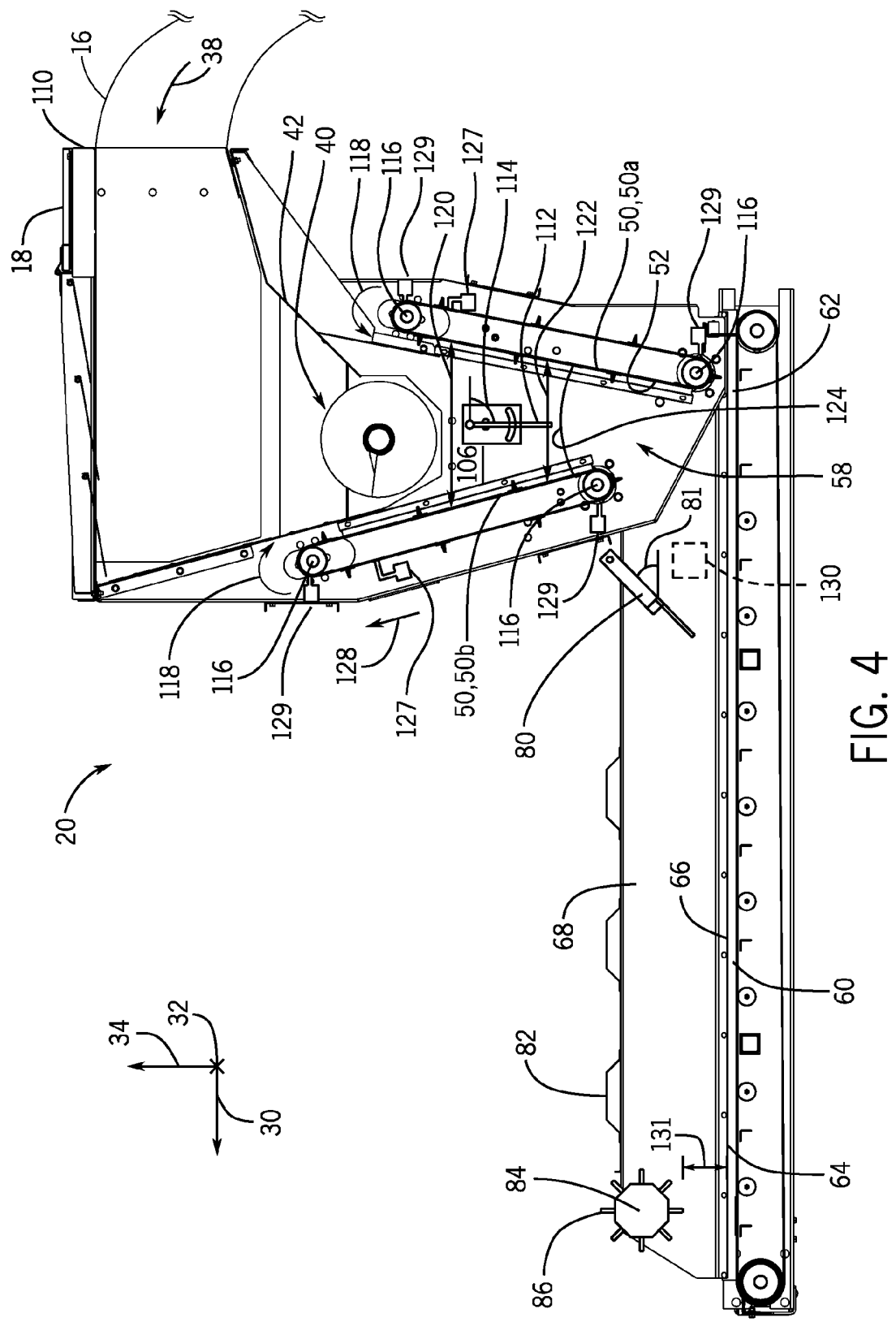
FIG. 4 is a cross-sectional side view of the feeding system of FIG. 2.

FIG. 4 is a cross-sectional side view of the feeding system 20 of FIG. 2. As shown, the feeding system 20 includes the pneumatic channel 16 configured to direct the crops into the hopper 18 via the air flow 38. In the illustrated embodiment, the pneumatic channel 16 is coupled to the hopper 18 along a first side 110 (e.g., forward side) of the hopper 18, although the pneumatic channel 16 may be coupled to the hopper 18 at any suitable location. The crops is urged toward the auger 40 by the air flow 38, and rotation of the auger 40 directs and/or meters the crops into the passageway 106, as discussed above.

Once the crops are in the passageway 106, the belts 50 direct and/or urge the crops toward the outlet 58. As shown, a flow divider 112 (e.g., vane) is provided within the passageway 106 to control flow of the crops through the passageway 106. For example, the flow divider 112 reduces undesirable accumulation of the crops and/or directs the crops toward the belts 50. The flow divider may be oriented at a flow divider angle 114 relative to the axial axis 30. In the illustrated embodiment, the belts 50 are positioned on axially opposite sides of the passageway 106. As each of the belts 50 rotates about a corresponding pair of drive wheels 116 as shown by arrows 118, the continuous surface 52 and/or the protrusions 56 of each of the belts 50 urge the crops vertically downward toward the outlet 58. The drive wheels 116 may be driven to rotate by any suitable drive system, such as a hydraulic drive system, or the like. As shown, the belts 50 are vertically offset relative to one another. For example, a forward belt 50a may be relatively closer to the conveyor 60 along the vertical axis 34 as compared to a rearward belt 50b. As shown, the belts 50 converge toward one another downwardly along the vertical axis 34 between the auger 40 and outlet 58, such that a first axial distance 120 between the belts 50 at an upper portion of the passageway 106 is greater than a second axial distance 122 between the belts 50 at a lower portion of the passageway 106 (e.g., the passageway 106 is tapered downwardly along the vertical axis 34). Thus, the forward belt 50a and the rearward belt 50b are oriented at an angle 124 relative to one another. The angle 124 may be any suitable angle, such as 15 to 60 degrees, 20 to 50 degrees, or 25 to 45 degrees, for example.

In certain embodiments, the position and/or the orientation of the belts 50 are adjustable. For example, the belts 50 may be moved along the vertical axis 34 and/or along the axial axis 32 via one or more position actuators 127 of a position control system. In such cases, the belts 50 may be moved independently from one another, or together. By way of example, with reference to FIG. 4, movement of the second belt 50b away from the conveyor 60, as shown by arrow 128, causes the outlet 58 to increase in size, thereby enabling the feeding system 20 to generate a relatively larger mat, a relatively thicker mat, and/or a relatively less dense mat. In some cases, the orientation of the belts 50 relative to one another may be adjusted by one or more orientation actuators 129 of an orientation control system. For example, the angle 124 may be adjusted via rotation of the first belt 50a and/or the second belt 50b about rotation points at any of the drive wheels 116. Such adjustments may enable the feeding system 20 to change the first axial distance 120 and/or the second axial distance 122, as well as the size and/or shape of the passageway 106 and/or the outlet 58. Such adjustments enable the feeding system 20 to generate mats having various characteristics and/or to effectively feed crops of various characteristics (e.g., density, moisture, unit size or the like), for example.

In some embodiments, a linear speed of the belts 50 is adjustable. In the illustrated embodiment, a speed control system may change the rotation rate of the drive wheels 116, thereby causing the linear speed of the belts 50 to change. The linear speed of the first belt 50a and the second belt 50b may be changed independently, or together. Changing the linear speed of the belts 50 may enable the feeding system 20 to control characteristics of the mat, such as the density of the mat, for example. Other features of the feeding system 20 may also be adjustable, such as a linear speed of the conveyor 60, a rotational rate of the auger 40, a rotational rate of the spiked wheel 84, a distance 131 between the spiked wheel 84 and the conveyor 60, the harrow angle 81 between the harrow 80 and the conveyor 60, the flow divider angle 114 between the flow divider 112 and the axial axis 30, or a combination thereof, via various control systems, for example. As discussed in more detail below, processing equipment of the feeding system 20 may be configured to control such adjustments in response to various inputs, including data indicative of characteristics of the mat (e.g., depth, weight, density, or the like).

In some embodiments, the feeding system 20 includes a sensor assembly 130 configured to output signals indicative of any of a variety of characteristics of the mat formed by the feeding system 20. For example, the sensor assembly 130 may detect a depth (e.g., thickness) of the mat, a weight of the mat, and/or a density of the mat. The sensor assembly 130 may be any suitable type of sensor (e.g., an optical sensor, a mechanical or electrical contact sensor, a load cell or transducer, or the like) and may be positioned in any suitable location within the feeding system 20. For example, the sensor assembly 130 may be positioned proximate the outlet 58, such as coupled to one of the supports 54 or coupled to one of the walls 68, as shown. In certain embodiments, the sensor assembly 130 may be an optical sensor and may be configured to output signals indicative of the depth of the mat. In some embodiments, the sensor assembly 130 may include a load cell sensor coupled to a hinged door (e.g., a flapper door) positioned across the outlet 58 and/or across the conveyor 60 and configured to output signals indicative of the weight and/or the density of the mat. For example, the sensor assembly 130 may monitor a force exerted by the mat as the mat travels past the hinged door, and the force may be indicative of the weight and/or the density of the mat.

In some embodiments, the sensor assembly 130 may be mounted below the conveyor 60 to facilitate detection of the weight of the mat. In certain embodiments, more than one sensor assembly 130 is provided in any suitable locations. For example, one sensor assembly 130 may be an optical sensor configured to monitor the depth of the mat, and another sensor assembly 130, such as the load cell coupled to the hinged door, may be configured to monitor the weight and/or the density of the mat. By way of another example, one sensor assembly 130 may be coupled to the wall 68, while another sensor assembly 130 may be mounted below the conveyor 60. As discussed in more detail below, the sensor assembly 130 may be configured to output signals indicative of characteristics of the mat to a control system. Further, the control system may be configured to adjust various features of feeding system 20 based on the signals received from the sensor assembly 130. For example, the control system may send control signals to adjust the position, the orientation, and/or the speed of the belts 50.

Figure 5:
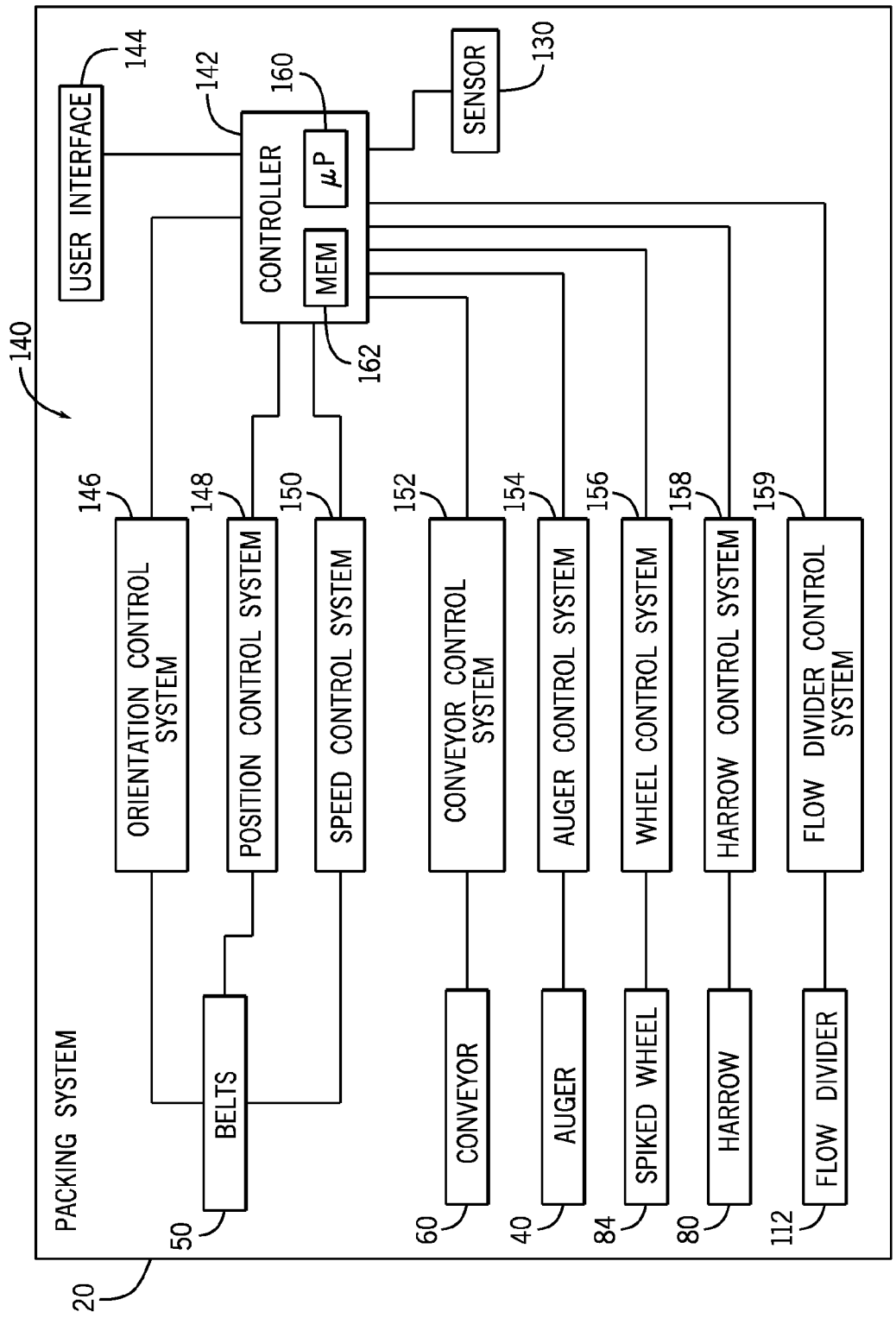
FIG. 5 is a schematic diagram of a feeding system.

FIG. 5 is a schematic diagram of an embodiment of a feeding system 20. In the illustrated embodiment, the feeding system 20 includes a control system 140 having a controller 142 configured to receive signals from the sensor assembly 130. The signals may be indicative of various characteristics of the mat, such as the depth, weight, and/or density of the mat at a location proximate to the outlet 58. As discussed in detail below, the controller 142 may control the position of the belts 50, the orientation of the belts 50, and/or the speed of the belts 50 via various control systems based on the received signals. Further, the controller 142 may control the speed of the conveyor 60 and/or the rotational speed of the auger 40 via various control systems based on the received signals. In certain embodiments, the illustrated control systems are automated, although in some embodiments, a user may provide various inputs to adjust the features of the feeding system 20 via a user interface 144.

In the illustrated embodiment, the control system 140 includes an orientation control system 146 configured to control the orientation of the belts 50 relative to the conveyor 60 and/or the axial axis 30. For example, the orientation control system 146 may include a drive system, such as a hydraulic drive system, that controls the one or more actuators 129 to adjust the angle 124 of the belts 50 relative to one another, as shown in FIG. 4. As shown, the control system 140 also includes a position control system 148 configured to control the position of the belts 50 relative to the conveyor 60 and/or relative to one another. For example, the position control system 148 may include a drive system, such as a hydraulic drive system, that controls the one or more actuators 127 to adjust the belts 50 along the vertical axis 34 and/or along the axial axis 30, as shown in FIG. 4. Additionally, the illustrated control system 140 includes a speed control system 150 configured to control the linear speed of the belts 50. For example, the speed control system 150 may include a drive system, such as a hydraulic drive system, that controls a rotational rate of the drive wheels 116, thereby controlling the linear speed of the belts 50.

As shown, the control system 140 includes a conveyor control system 152 configured to control a speed of the conveyor 60, and an auger control system 154 configured to control a speed of the auger 40. The control system 140 also includes a wheel control system 156 configured to control the rotational rate of the spiked wheel 84 and/or the distance 131 between the spiked wheel 84 and the conveyor 60, a harrow control system 158 configured to control the harrow angle 81 between the harrow 80 and the conveyor 60, and a flow divider control system 159 configured to control the flow divider angle 114 between the flow divider 112 and the axial axis 30, for example.

In certain embodiments, the controller 142 is an electronic controller having electrical circuitry configured to process data from the sensor assembly 130 and/or other components of the control system 140. In the illustrated embodiment, the controller 142 includes a processor, such as the illustrated microprocessor 160, and a memory device 162. The controller 142 may also include one or more storage devices and/or other suitable components. The processor 160 may be used to execute software, such as software for controlling the feeding system 20, and so forth. Moreover, the processor 160 may include multiple microprocessors, one or more "general-purpose" microprocessors, one or more special-purpose microprocessors, and/or one or more application specific integrated circuits (ASICS), or some combination thereof. For example, the processor 160 may include one or more reduced instruction set (RISC) processors.

The memory device 162 may include a volatile memory, such as random access memory (RAM), and/or a nonvolatile memory, such as ROM. The memory device 162 may store a variety of information and may be used for various purposes. For example, the memory device 162 may store processor-executable instructions (e.g., firmware or software) for the processor 160 to execute, such as instructions for controlling the feeding system 20. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., desired mat depth, desired mat weight, and/or desired mat density), instructions (e.g., software or firmware for controlling the feeding system 20, etc.), and any other suitable data.

With reference to FIG. 5, in certain embodiments, the sensor assembly 130 may provide signals indicative of the depth and/or the weight of the mat at a location proximate to the outlet 58 to the controller 142. If the processor 160 of the controller 142 determines that the depth of the mat is less than a desired depth (e.g., stored in the memory device 162 and/or suitable for effectively forming the bale in the baler 22), the control system 140 may adjust the belts 50 in a manner that causes the mat to increase in depth. For example, the position control system 146 may move one or both belts 50 to increase the second axial distance 122 proximate the outlet 58, thereby enabling formation of a mat of greater depth/thickness. If the processor 160 of the controller 142 determines that the mat is less than a predetermined desired weight and/or density (e.g., stored in the memory device 162 and/or suitable for effectively forming the bale in the baler 22), the control system 140 may adjust the belts 50 in a manner that causes the mat to increase in weight and/or density. For example, the speed control system 150 may slow the rotational rate of the drive wheels 116, thereby decreasing the speed of the belts 50. The slower speed of the belts 50 enables more crops to accumulate in the passageway 106 and facilitates formation of a mat of greater weight and/or density.

In some embodiments, the control system 140 may be configured to receive other inputs, including data indicative of characteristics of the crops or harvesting process (e.g., crops type, crops moisture content, crops yield or volume of crops flowing into the hopper, or the like) via the user interface 44 and/or via suitable sensors, and/or various other operator inputs (e.g., desired bale density or the like) via the user interface 44. In some embodiments, the control system may be configured to adjust the various features of the feeding system 20 based on the data indicative of characteristics of the crops and/or the operator inputs. For example, the operator may input a desired density of the bale to be generated by the baler 22, and the control system 140 may be configured to control the various components of the feeding system 20 in response to the input.

The feeding system 20 disclosed above may be adapted for use with a variety of crops and a variety of agricultural equipment. For example, the feeding system 20 may be adapted for feeding hay, straw, grasses, silage, corn stalks, tobacco, cotton, biomass, or any other suitable compressible material. Further, the feeding system 20 may be integrated into any driven or towed agricultural implement, or in some embodiments, the feeding system 20 may be adapted for use with a free-standing baler.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A feeding system for an agricultural implement, comprising:
   a hopper configured to receive agricultural crop material;
   an auger extending across the hopper, wherein the auger is configured to meter the agricultural crop material from the hopper into a tapered passageway;
   a movable belt disposed along one side of the tapered passageway, wherein the movable belt is configured to urge the agricultural crop material through the tapered passageway toward an outlet of the tapered passageway to form the agricultural crop material into a mat having a thickness substantially equal to a width of the outlet;
   a sensor assembly configured to output signals indicative of the thickness of the mat, a weight of the mat, a density of the mat, or any combination thereof; and
   a controller configured to receive the signals from the sensor assembly indicative of the thickness, the weight, the density, or the combination thereof, and to adjust a position of the movable belt, an orientation of the movable belt, a speed of the movable belt, or any combination thereof, based on the signals to control the thickness of the mat, the weight of the mat, the density of the mat, or a combination thereof.

2. The feeding system of claim 1, comprising a conveyor disposed vertically below the outlet, wherein the conveyor is configured to receive the mat from the outlet and to transfer the mat toward a baling chamber of the agricultural implement.

3. The feeding system of claim 1, comprising a pneumatic conduit coupled to an inlet of the hopper and configured to deliver the agricultural crop material to the hopper via an air flow.

4. The feeding system of claim 1, wherein the auger comprises a first helicoid structure in a first portion of the auger and a second helicoid structure in a second portion of the auger, and the first helicoid structure is oriented in a first orientation, and the second helicoid structure is oriented in a second orientation, different from the first orientation.

5. The feeding system of claim 4, wherein the first helicoid structure and the second helicoid structure are configured to urge the agricultural crop material to a center portion of the hopper, and the tapered passageway extends vertically below the center portion of the hopper.

6. The feeding system of claim 1, wherein the movable belt comprises lateral protrusions that extend into the tapered passageway, and the lateral protrusions are configured to engage the agricultural crop material and urge the agricultural crop material toward the outlet.

7. The feeding system of claim 1, wherein the controller is configured to adjust a dimension of the outlet based on the signals.

8. A feeding system for an agricultural implement, comprising:
   a hopper configured to receive agricultural crop material;
   an auger extending across the hopper, wherein the auger is configured to meter the agricultural crop material from the hopper into a tapered passageway;
   a movable belt disposed along one side of the tapered passageway, wherein the movable belt is configured to urge the agricultural crop material through the tapered passageway toward an outlet of the tapered passageway to form the agricultural crop material into a mat having a thickness substantially equal to a width of the outlet;
   a sensor assembly configured to output signals indicative of the thickness of the mat, a weight of the mat, a density of the mat, or any combination thereof; and
   a controller configured to receive the signals from the sensor assembly indicative of the thickness, the weight, the density, or the combination thereof, and to adjust a dimension of the outlet based on the signals.

9. The feeding system of claim 8, comprising a conveyor disposed vertically below the outlet, wherein the conveyor is configured to receive the mat from the outlet and to transfer the mat toward a baling chamber of the agricultural implement.

10. The feeding system of claim 8, comprising a pneumatic conduit coupled to an inlet of the hopper and configured to deliver the agricultural crop material to the hopper via an air flow.

11. The feeding system of claim 8, wherein the auger comprises a first helicoid structure in a first portion of the auger and a second helicoid structure in a second portion of the auger, and the first helicoid structure is oriented in a first orientation, and the second helicoid structure is oriented in a second orientation, different from the first orientation.

12. The feeding system of claim 11, wherein the first helicoid structure and the second helicoid structure are configured to urge the agricultural crop material to a center portion of the hopper, and the tapered passageway extends vertically below the center portion of the hopper.

13. The feeding system of claim 8, wherein the movable belt comprises lateral protrusions that extend into the tapered passageway, and the lateral protrusions are configured to engage the agricultural crop material and urge the agricultural crop material toward the outlet.

\* \* \* \* \*